United States Patent
Mundhenk et al.

(10) Patent No.: US 9,772,405 B2
(45) Date of Patent: Sep. 26, 2017

(54) BACKFILLING CLOUDS OF 3D COORDINATES

(71) Applicant: The Boeing Company, Chicago, IL (US)

(72) Inventors: Terrell Nathan Mundhenk, Calabasas, CA (US); Yuri Owechko, Newbury Park, CA (US); Kyungnam Kim, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 338 days.

(21) Appl. No.: 14/506,866

(22) Filed: Oct. 6, 2014

(65) Prior Publication Data

US 2016/0097858 A1 Apr. 7, 2016

(51) Int. Cl.
| | |
|---|---|
| *H04N 7/18* | (2006.01) |
| *G01S 17/89* | (2006.01) |
| *G01S 17/42* | (2006.01) |
| *G01S 17/02* | (2006.01) |
| *G01S 17/87* | (2006.01) |
| *G06T 5/50* | (2006.01) |

(52) U.S. Cl.
CPC ............ *G01S 17/89* (2013.01); *G01S 17/023* (2013.01); *G01S 17/42* (2013.01); *G01S 17/87* (2013.01); *G06T 5/50* (2013.01); *G06T 2207/10004* (2013.01); *G06T 2207/10024* (2013.01); *G06T 2207/10028* (2013.01)

(58) Field of Classification Search
CPC ........... G01S 17/08; G01S 17/42; G01S 17/87
USPC .................................................... 348/42, 135
See application file for complete search history.

(56) References Cited

U.S. PATENT DOCUMENTS

| | | | | |
|---|---|---|---|---|
| 8,867,823 | B2 * | 10/2014 | Wildeboer | H04N 13/0271 345/419 |
| 2006/0062300 | A1 * | 3/2006 | Park | H04N 19/70 375/240.12 |

(Continued)

OTHER PUBLICATIONS

Arrowsmith et al., Notes on Lidar interpolation, Department of Geological Sciences, Arizona State University, May 24, 2006.

(Continued)

*Primary Examiner* — Jeremaiah C Hallenbeck-Huber
(74) *Attorney, Agent, or Firm* — Duft Bornsen & Fettig LLP (57) ABSTRACT

Systems and methods are provided for backfilling a 3D cloud of coordinates. One embodiment is an apparatus that includes a camera able to capture an image, and a ranging system able to measure distances objects. The apparatus also includes a controller able to analyze the measured distances to generate a cloud of three dimensional coordinates, and to project coordinates of the cloud onto the image to match the coordinates with pixels of the image. The controller is also able to generate additional coordinates to increase the resolution of the cloud by iteratively defining a scanning window, detecting a group of coordinates that have been projected onto the scanning window, scoring each coordinate in the group based on its similarity to other coordinates in the group, dividing the scanning window into quadrants, selecting a coordinate from each quadrant, and generating an additional coordinate based on the selected coordinates.

20 Claims, 12 Drawing Sheets

(56) References Cited

U.S. PATENT DOCUMENTS

| | | | | |
|---|---|---|---|---|
| 2007/0024614 A1* | 2/2007 | Tam | G06T 7/0067 | 345/419 |
| 2010/0141651 A1* | 6/2010 | Tan | G06T 7/0071 | 345/420 |
| 2010/0309292 A1* | 12/2010 | Ho | H04N 13/026 | 348/47 |
| 2011/0115886 A1* | 5/2011 | Nguyen | H04N 13/025 | 348/47 |
| 2011/0285813 A1* | 11/2011 | Girdzijauskas | H04N 13/0011 | 348/42 |
| 2012/0141016 A1* | 6/2012 | Wildeboer | H04N 13/0271 | 382/154 |
| 2012/0200669 A1* | 8/2012 | Lai | G06T 5/002 | 348/43 |
| 2012/0313944 A1* | 12/2012 | Kontkanen | G06T 1/60 | 345/426 |
| 2013/0072784 A1* | 3/2013 | Velusamy | A61B 18/12 | 600/424 |
| 2014/0132733 A1 | 5/2014 | Mundhenk et al. | | |
| 2014/0146139 A1* | 5/2014 | Schwartz | H04N 13/0018 | 348/43 |
| 2014/0205023 A1* | 7/2014 | Girdzijauskas | H04N 19/597 | 375/240.27 |
| 2014/0300732 A1* | 10/2014 | Friend | G06T 7/0042 | 348/135 |
| 2015/0049169 A1* | 2/2015 | Krig | G06T 7/0075 | 348/46 |
| 2015/0063707 A1* | 3/2015 | Fu | G06T 7/0085 | 382/199 |
| 2015/0071526 A1* | 3/2015 | Nguyen | G06T 5/10 | 382/154 |
| 2015/0139533 A1* | 5/2015 | Wu | H04N 13/0018 | 382/154 |
| 2015/0202770 A1* | 7/2015 | Patron | G05D 1/024 | 700/245 |
| 2015/0245061 A1* | 8/2015 | Chen | H04N 19/597 | 375/240.13 |
| 2015/0254811 A1* | 9/2015 | Sahu | H04N 13/0007 | 382/154 |
| 2015/0319421 A1* | 11/2015 | Chung | G06T 7/0097 | 348/46 |
| 2016/0012638 A1* | 1/2016 | Skrobanski | G06T 17/00 | 345/420 |

OTHER PUBLICATIONS

Badino et al., Fast and Accurate Computation of Surface Normals from Range Images, International Conference on Robotics and Automation (ICRA), Shanghai, China, May 2011.

Mirzaei et al., 3D LIDAR-camera intrinsic and extrinsic calibration: Identifiability and analytical least-squares-based initialization, The International Journal of Robotics Research 31 (4).

Moreno-Noguer et al., Accurate Non-Iterative O(n) Solution to the PnP Problem, pp. 1-8.

Wang et al., A New Upsampling Method for Mobile LiDAR Data, p. 17.

Wang et al., Automatic Registration of Mobile LiDAR and Spherical Panoramas.

Zhao, et al., Fusion of Velodyne and Camera Data for Scene Parsing, 15th International Conference on Information Fusion (FUSION), pp. 1172-1179.

* cited by examiner

BACKFILLING CLOUDS OF 3D COORDINATES

RELATED APPLICATIONS

This application herein incorporates by reference the entirety of U.S. patent application Ser. No. 13/673,429, entitled "BACKFILLING POINTS IN A POINT CLOUD," filed on Nov. 9, 2012.

FIELD

The disclosure relates to the field of imaging, and in particular, to three dimensional (3D) imaging.

BACKGROUND

When investigating a remotely located object, multiple imaging and analysis tools may be used to determine the nature of the object. For example, cameras may capture a two dimensional (2D) image of the object. Images acquired from cameras are beneficial in that they provide high resolution color data of whatever object/scene is being imaged. However, 2D images from a camera do not provide any kind of ranging information, meaning that it is hard to use a single image from a camera to generate a 3D representation of the object.

Ranging systems are devices that measure distances to remote objects, enabling the creation of a cloud of 3D coordinates that represent the surface of the object. However, ranging systems lack color data, and are often much lower resolution than images taken by a camera. Therefore, a cloud of 3D coordinates for a ranging system is hard to interpret unless it is "backfilled" with additional coordinates. During the backfill process, coordinates are added to the cloud, and the position of each added coordinate is extrapolated based on the positions of neighboring coordinates in the cloud.

Backfill techniques remain imperfect and processing intensive. Users therefore continue to desire backfill techniques that operate quickly and efficiently to enhance the resolution of 3D coordinate clouds (also known as "point clouds").

SUMMARY

Embodiments described herein provide new techniques for backfilling a 3D cloud of coordinates with additional coordinates. Specifically, points from a 3D coordinate cloud are projected onto a 2D image. The image is then divided into portions known as "scanning windows." Coordinates that have been projected onto each scanning window are scored based on their similarity to other coordinates within the scanning window. The scanning window is divided into quadrants, and a new coordinate is generated based on the highest scoring coordinate from each quadrant.

One embodiment is an apparatus that generates backfilled coordinate clouds. The apparatus includes a camera able to capture a two dimensional image in a field of view, and a ranging system able to measure distances to at least one object in the field of view. The apparatus also includes a controller able to analyze the distances to generate a cloud of three dimensional coordinates, and to project coordinates of the cloud onto the image to match the coordinates with corresponding pixels of the image. The controller is also able to generate additional coordinates to increase the resolution of the cloud by iteratively defining a scanning window encompassing a portion of the image, detecting a group of coordinates that have been projected onto the scanning window, scoring each coordinate in the group based on its similarity to other coordinates in the group, dividing the scanning window into quadrants, selecting the highest scoring coordinate from each quadrant, and generating an additional coordinate that is positioned within the cloud based on the selected coordinates. The controller is additionally able to transmit the cloud for display.

Another embodiment is a method for backfilling a cloud of coordinates. The method includes acquiring a two dimensional image in a field of view, acquiring measured distances to at least one object in the field of view, analyzing the distances to generate a cloud of three dimensional coordinates, and projecting coordinates of the cloud onto the image to match the coordinates with corresponding pixels. The method further includes generating additional coordinates to increase the resolution of the cloud, by iteratively defining a scanning window encompassing a portion of the image, detecting a group of coordinates that have been projected onto the scanning window, scoring each coordinate in the group based on its similarity to other coordinates in the group, dividing the scanning window into quadrants, selecting the highest scoring coordinate from each quadrant, and generating an additional coordinate that is positioned within the cloud based on the selected coordinates. The method also includes displaying the cloud.

Another embodiment includes a non-transitory computer readable medium embodying programmed instructions which, when executed by a processor, are operable for performing a method. The method includes acquiring a two dimensional image in a field of view, acquiring measured distances to at least one object in the field of view, analyzing the distances to generate a cloud of three dimensional coordinates, and projecting coordinates of the cloud onto the image to match the coordinates with corresponding pixels. The method further includes generating additional coordinates to increase the resolution of the cloud, by iteratively defining a scanning window encompassing a portion of the image, detecting a group of coordinates that have been projected onto the scanning window, scoring each coordinate in the group based on its similarity to other coordinates in the group, dividing the scanning window into quadrants, selecting the highest scoring coordinate from each quadrant, and generating an additional coordinate that is positioned within the cloud based on the selected coordinates. The method also includes displaying the cloud.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
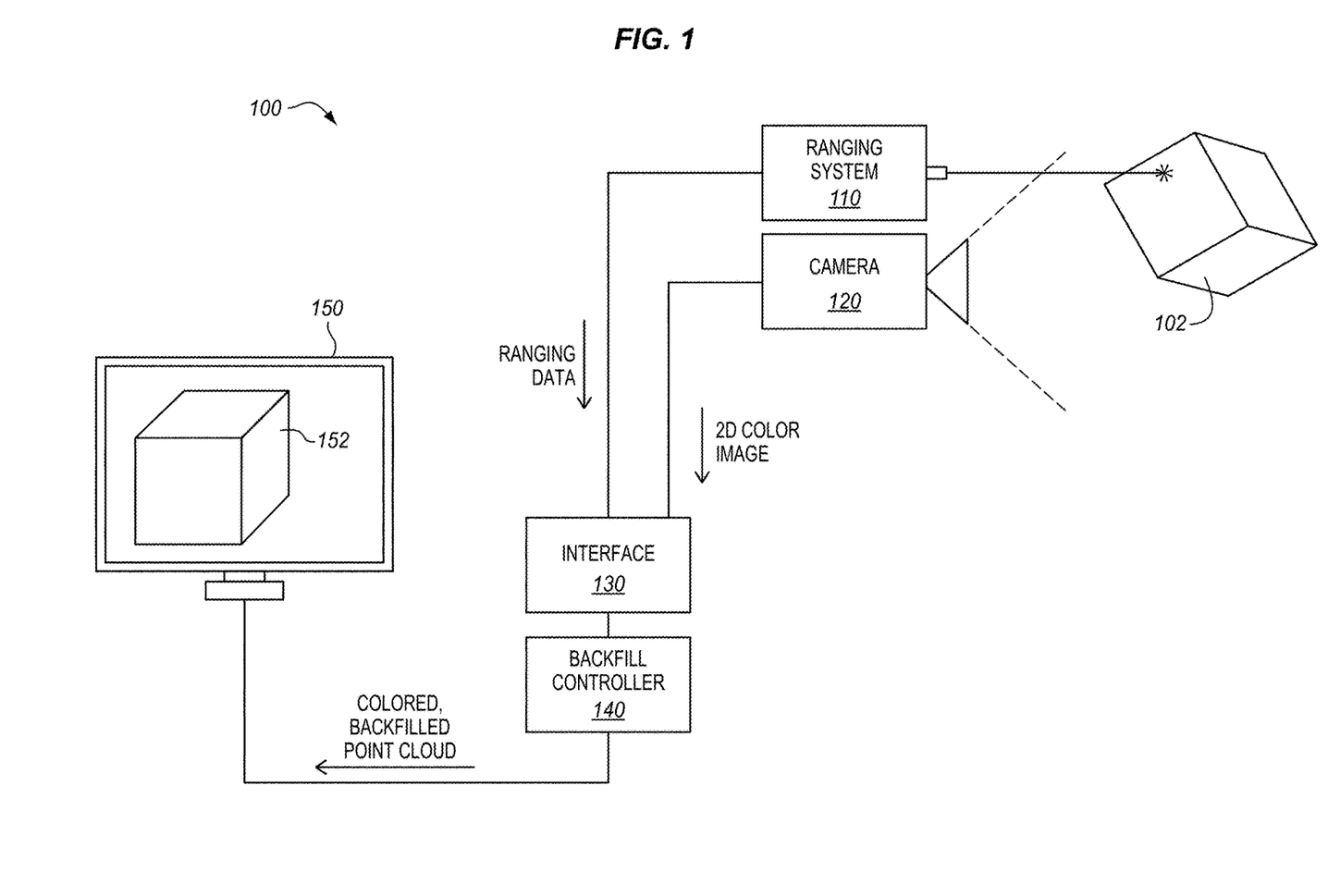
FIG. 1 is a block diagram of a system for generating backfilled clouds of 3D coordinates in an exemplary embodiment.

FIG. 1 is a block diagram of a system 100 for generating backfilled clouds of 3D coordinates in an exemplary embodiment. According to FIG. 1, a ranging system 110 (e.g., a Light Detection and Ranging (LIDAR) system) and a camera 120 operate together to analyze a remote object 102. In one embodiment, camera 120 comprises a multi-lens panoramic camera capable of capturing a 360 degree image of its surroundings. Camera 120 acquires 2D color images of a field of view including object 102, while ranging system 110 measures distances to surfaces within the field of view. The data from ranging system 110 and camera 120 is provided to interface 130 (e.g., an Ethernet interface), which passes the information onward to backfill controller 140.

Backfill controller 140 generates a cloud of 3D coordinates based on the measured distances from ranging system 110, then backfills the cloud with additional coordinates based on the image captured by camera 120. Controller 140 then provides the backfilled cloud of coordinates to display 150 as a 3D model 152. Controller 140 may be implemented, for example, as custom circuitry, as a processor executing programmed instructions, etc. In one embodiment, controller 140 includes a processor as well as a Graphics Processing Unit (GPU), where the processor manages the general operations of controller 140, and directs the GPU to perform processing-intensive backfilling techniques.

System 100 provides a benefit over prior systems, because its controller is capable of using 2D color image data from camera 120 to facilitate the backfilling and coloring of 3D point clouds from ranging system 110 (e.g., in real time). Specifically, controller 140 projects coordinates of the 3D cloud onto the 2D color image, divides the 2D image into portions known as scanning windows, and scores the projected coordinates in each scanning window. An additional coordinate is generated within each scanning window based on the highest scoring coordinate in each quadrant of the scanning window. This technique allows for greater point density and speed than prior techniques because it reliably generates a new coordinate for each scanning window.

Figure 2:
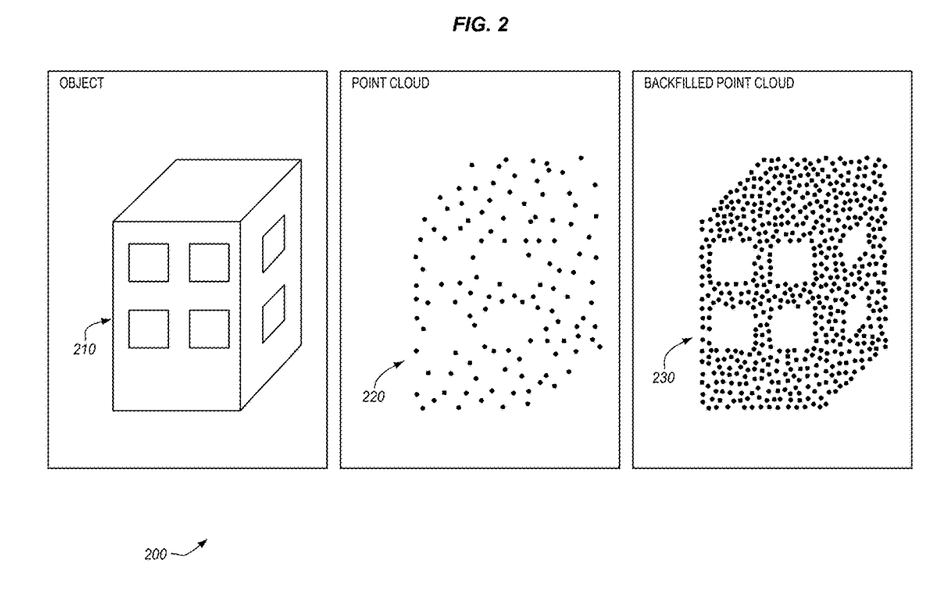
FIG. 2 is a diagram of an object, a coordinate cloud for the object, and a backfilled coordinate cloud for the object in an exemplary embodiment.

FIG. 2 is a diagram 200 illustrating the benefits of backfilling ranging data for an object. The left portion of FIG. 2 illustrates how an object such as a building may appear to the human eye. FIG. 2 illustrates that a low resolution point cloud 220, which represents the building, is hard to recognize as a building. Even though each distance to the building has been properly measured and represented on point cloud 220, there are simply not enough points of data, which makes point cloud 220 hard to recognize as a building. When backfilling techniques are used to "fill out" point cloud 220, it becomes much easier to recognize as a building. For example, backfilled cloud 230 (shown on the right) illustrates that a cloud with greater point density is easier to interpret.

Illustrative details of the operation of system 100 will be discussed with regard to FIG. 3. Assume, for this embodiment, that an object is being analyzed by ranging system 110 and camera 120. Specifically, ranging system 110 measures a set of distances to objects within a field of view at a rate of multiple times per second. Ranging system 110 may therefore be thought of as acquiring "frames" of data, where each frame corresponds to a set of measured distances that form a single 3D cloud of coordinates taken over a short period of time (e.g., about 100 milliseconds). Camera 120 captures images of the same field of view at a rate of multiple frames per second. For camera 120, a single frame corresponds to a color 2D image. FIG. 4, described in further detail below, illustrates an exemplary scene analyzed by camera 120 and ranging system 110. FIG. 4 depicts an exemplary scene 400, which includes a road 412, a building 414, and an office 416.

Figure 3:
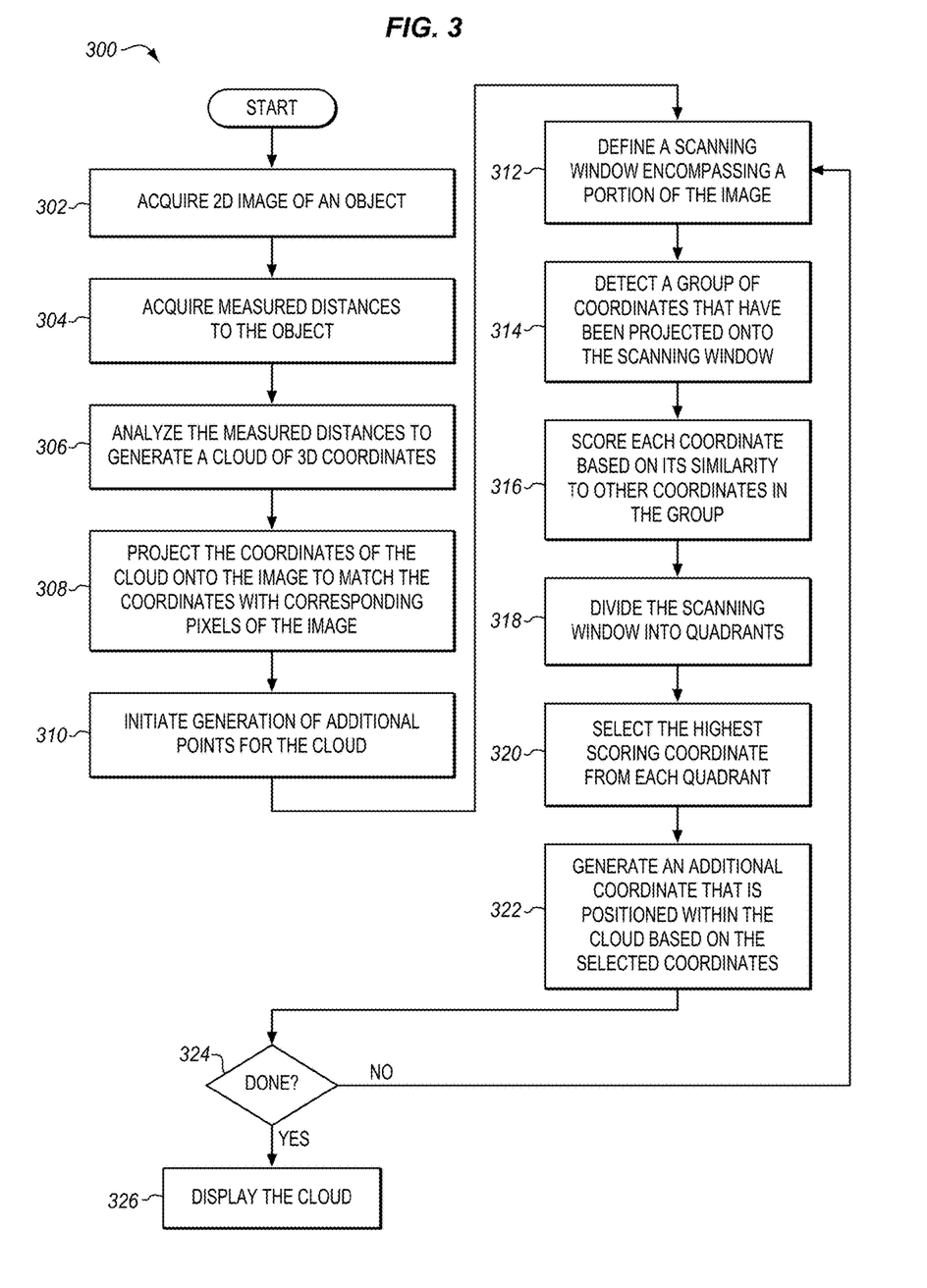
FIG. 3 is a flowchart illustrating a method for backfilling and coloring a point cloud in an exemplary embodiment.
Figure 4:
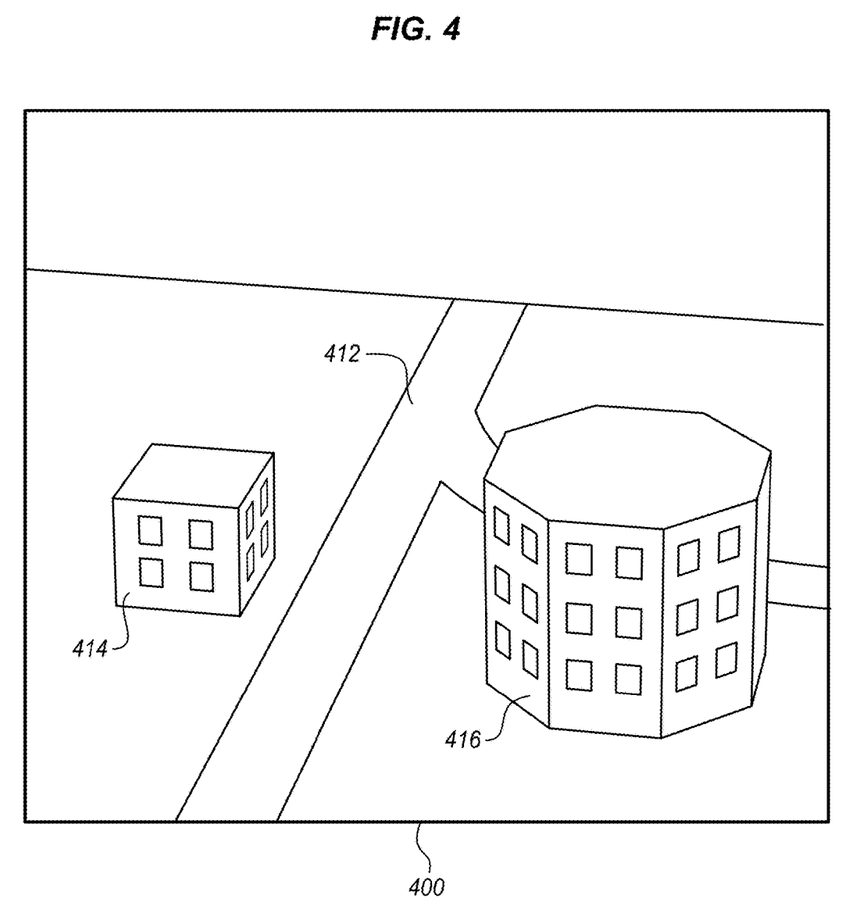
FIG. 4 is a diagram illustrating a location to be imaged in an exemplary embodiment.

FIG. 3 is a flowchart illustrating a method 300 for backfilling a point cloud in an exemplary embodiment. The steps of method 300 are described with reference to system 100 of FIG. 1, but those skilled in the art will appreciate that method 300 may be performed in other systems. The steps of the flowcharts described herein are not all inclusive and may include other steps not shown. The steps described herein may also be performed in an alternative order.

According to method 300, backfill controller 140 acquires a 2D color image of the field of view that is being imaged by camera 120 (step 302). The image may include, for example, an array of pixels representing the field of view. In step 304, controller 140 acquires measured distances to at least one object in the field of view. The distances have been measured by ranging system 110 within the same (or an overlapping) field of view as the image. In some embodiments, ranging system 110 takes longer to acquire data for a frame than camera 120. In order to synchronize acquisition of the 2D image and the 3D point cloud in such cases, controller 140 may trigger camera 120 to capture the image for a frame after it detects that ranging system 110 has begun actively measuring a set of distances for that frame.

In step 306, controller 140 analyzes the measured distances to generate a cloud of 3D coordinates that represent the object(s) being measured. The distances may be translated into 3D coordinates, for example, using triangulation techniques based on the direction that ranging system 110 was pointing when each distance was measured. The 3D coordinates may be generated as angular coordinates, Cartesian coordinates, etc.

In step 308, controller 140 projects coordinates of the cloud onto the image in order to match the coordinates with corresponding pixels of the image. As used herein, a "coordinate" refers to a defined 3D location/point, while a "pixel" refers to a single pel of a 2D color image. Coordinates as used herein are therefore defined by 3D positions, while pixels are not (because they all reside on the same 2D image).

Projecting coordinates of the cloud onto the image may include determining the relative positions and orientations of camera 120 and ranging system 110 with respect to each other, transforming the coordinate system used by ranging system 110 to that used for camera 120, and utilizing triangulation techniques, a transformation matrix, etc. to link the coordinates with pixels in the image. In one embodiment for panoramic images, each coordinate of the cloud is defined by an X, Y, and Z coordinate, which is offset based on the distance between camera 120 and ranging system 110, and then translated into an azimuth and altitude. The altitude and azimuth are then transformed into camera centric angular coordinates, which are themselves translated into a pixel row and column. In another embodiment, a 4×4 homogeneous transformation is used to perform the projection. Once the projection has been completed, the coordinates in the cloud are linked to specific pixels of the 2D color image.

Figure 5:
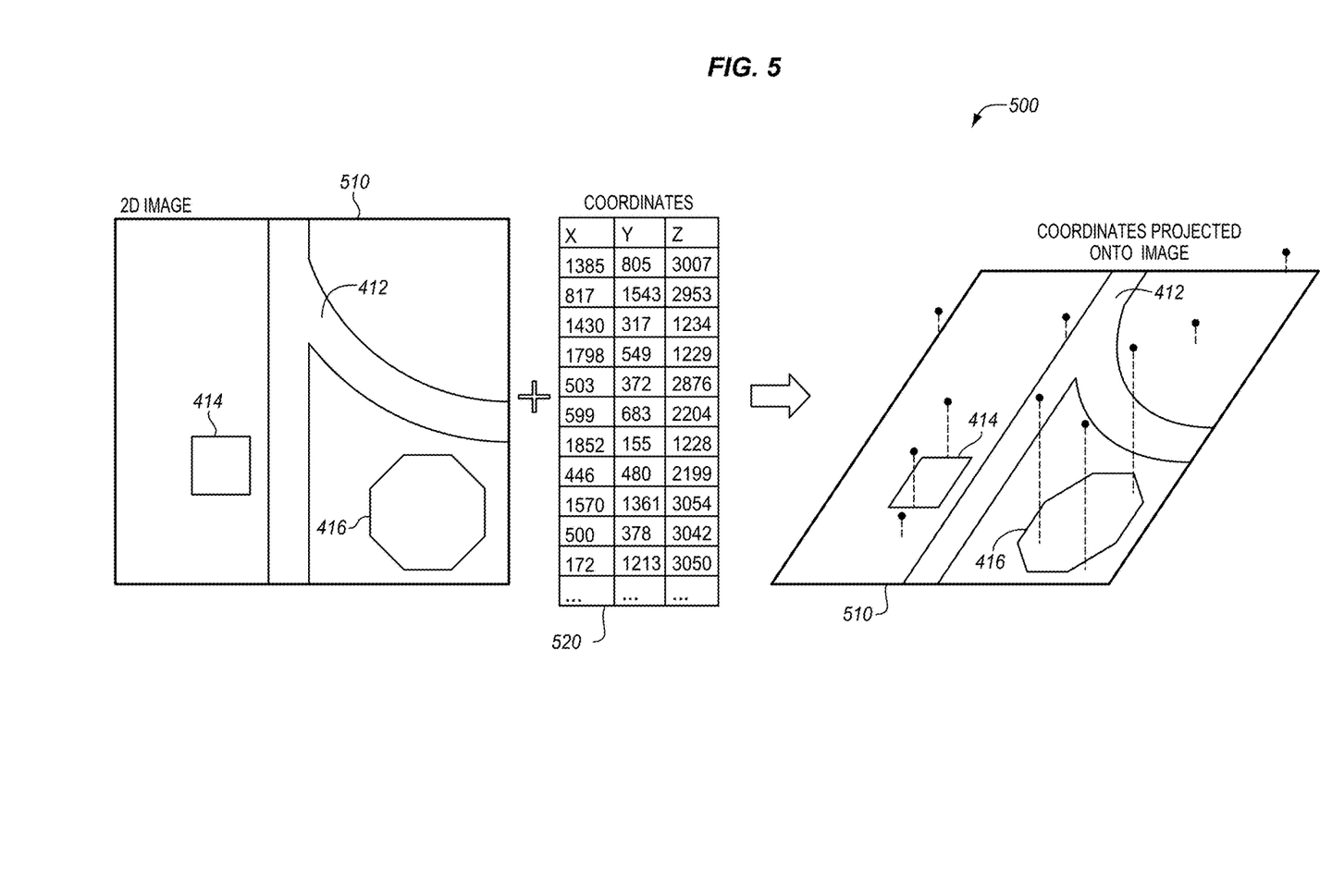
FIG. 5 is a diagram illustrating a top-down image of the location of FIG. 4, and the projection of a cloud of coordinates onto the top-down image in an exemplary embodiment.

FIG. 5 illustrates coordinates that have been projected onto an exemplary image. Specifically, FIG. 5 is a diagram 500 illustrating a top-down image 510 of the location of FIG. 4. Thus, image 510 was taken from a downward-pointing camera. As shown on the right side of FIG. 5, coordinates listed in table 520 are projected onto image 510. Note that most of the coordinates have a low height, except for the ones that correspond with building 414 and office 416, which are positioned higher because as shown in FIG. 4, building 414 and office 416 are taller than their surroundings.

Figure 6:
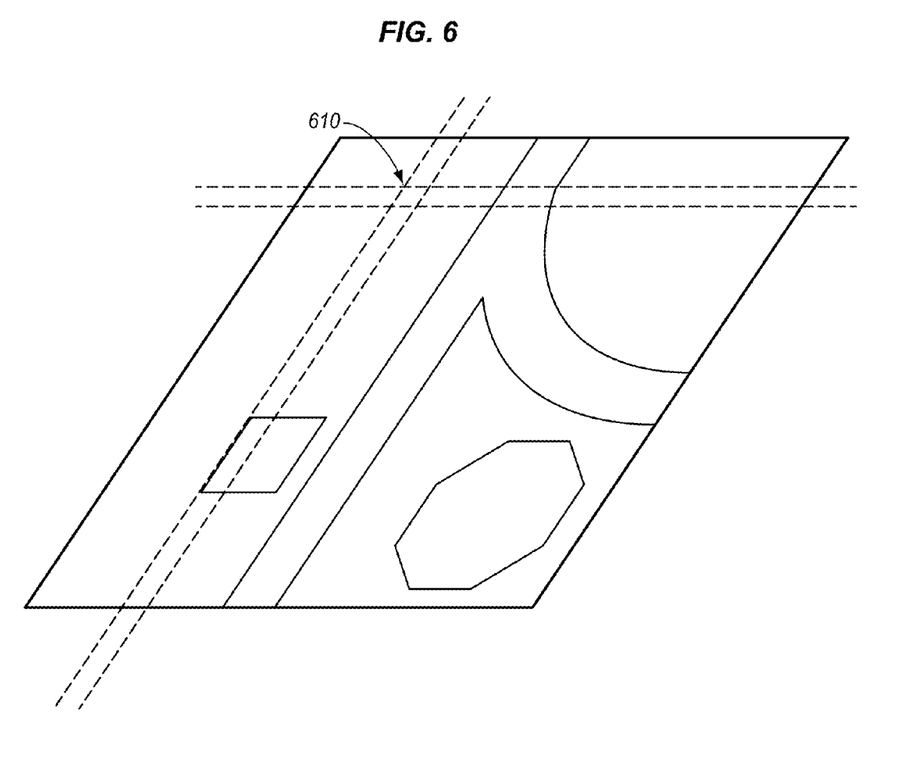
FIG. 6 is a diagram of a scanning window used for backfilling a point cloud in an exemplary embodiment.

In step 310, controller 140 initiates the generation of additional coordinates for the cloud in order to increase the resolution of the cloud, which includes steps 312-324. In step 312, backfill controller 140 defines a scanning window encompassing a portion of the image. For example, the scanning window may comprise a contiguous set of 5×5 pixel portion of the image, a 7×7 pixel portion of the image, a 21×21 pixel portion of the image, any set of pixels in the plane of the image, etc. The scanning window may therefore be considered to be co-planar with the image that it scans. FIG. 6 is a perspective view diagram 600 of a scanning window 610 used for backfilling a cloud in an exemplary embodiment. In this example, scanning window 610 encompasses a small, square portion of image 510.

Figure 7:
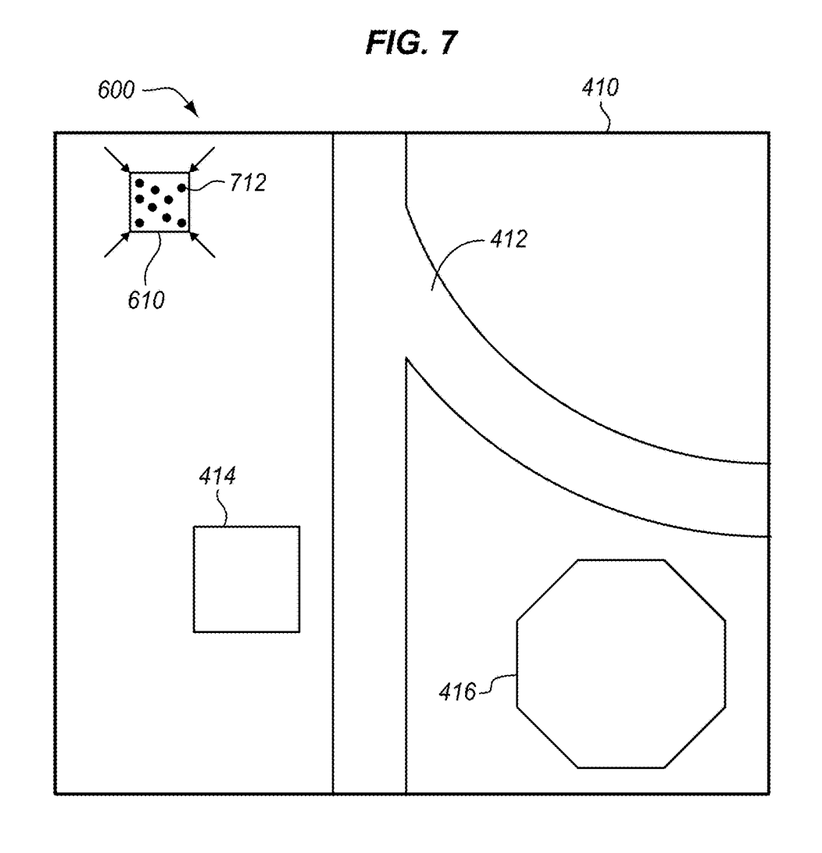
FIGS. 7-10 are further diagrams illustrating a scanning window that includes projected coordinates in an exemplary embodiment.
Figure 8:
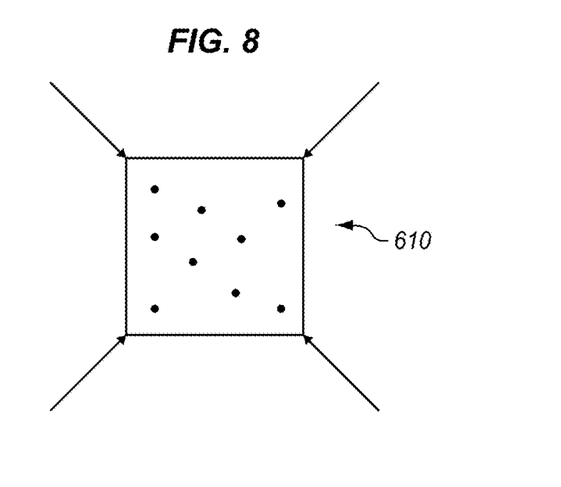

When the scanning window has been defined, controller 140 detects a group of coordinates that have been projected onto the scanning window in step 314. This information may be determined based on the known location of the scanning window in the image, as well as information from step 308. FIGS. 7-8 illustrate coordinates that have been projected onto scanning window 610. FIG. 7 illustrates, in a top-down view, that multiple coordinates from the cloud have been projected onto scanning window 610. As used herein, a coordinate is described as being "within" a scanning window if it has been projected onto a pixel included in the scanning window. FIG. 8 provides a zoomed-in view of scanning window 610, and each of the points projected onto pixels within scanning window 610.

In step 316, controller 140 scores each coordinate in the group based on its similarity to other coordinates in the group. Scoring the coordinates is performed in order to determine which coordinates in the scanning window are most likely to represent a contiguous 3D surface detected by ranging system 110. Each coordinate in the scanning window may be scored based on a function that considers the 2D proximity (within the plane of the image) or 3D proximity of the coordinate to other coordinates in the group, the similarity of the pixel color for the coordinate to the pixel colors of other coordinates in the group, etc.

Figure 9:
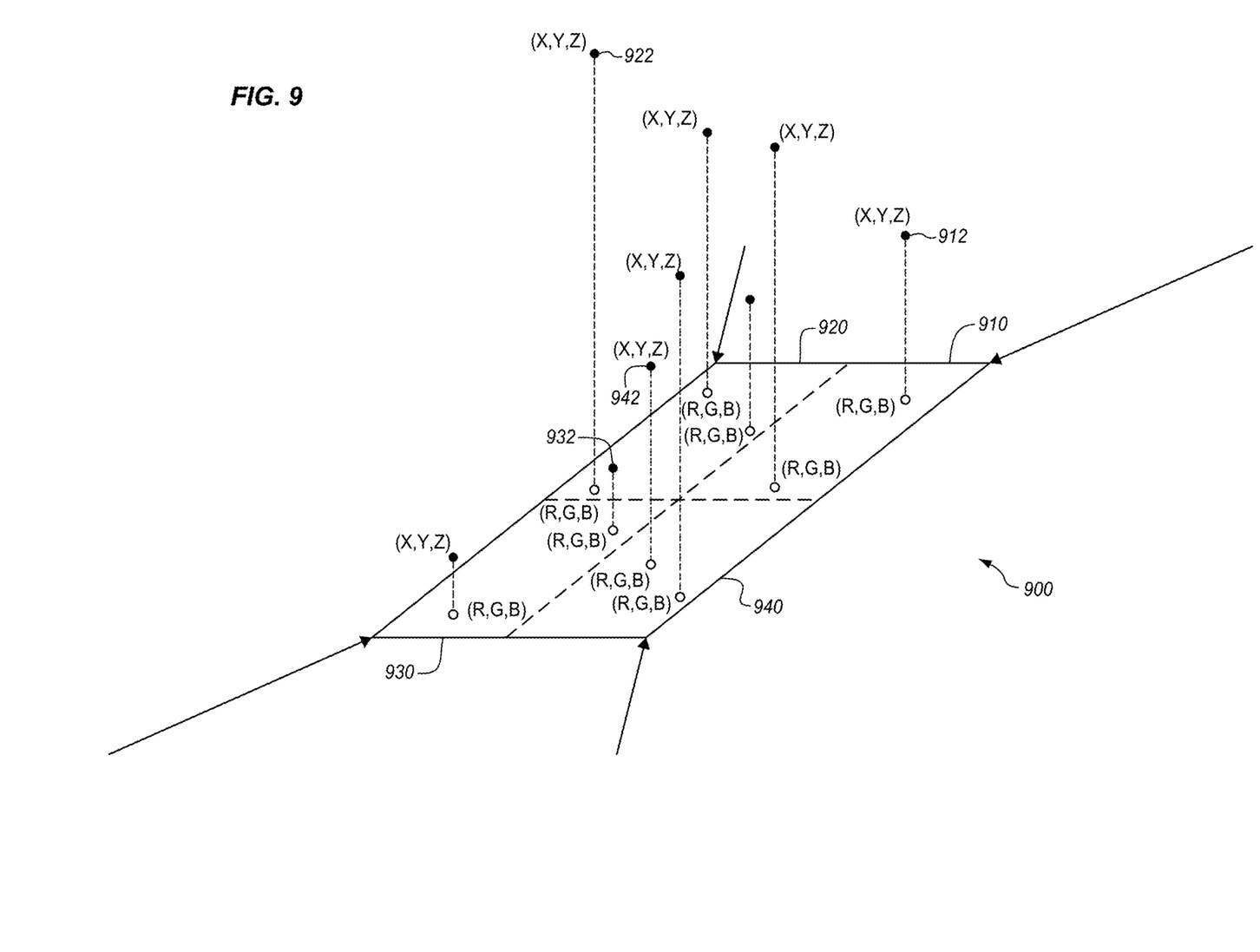

As used herein, the "color" of a coordinate in the cloud is the color of the pixel it has been projected onto, as illustrated in diagram 900 of FIG. 9. Specifically, as shown, each coordinate (shown as black dots) has been projected onto a single pixel (shown as a white circle). Each coordinate includes 3D position information, while each pixel includes color information (e.g., RGB values).

In one embodiment, a GPU of the controller sorts the coordinates based on their scores. To best utilize the circuit architecture of the GPU in such an embodiment, the sort may be performed using massive parallelization, with static memory and no recursion. Such a quick sort may be parallelized between windows, but serial within each window.

Figure 10:
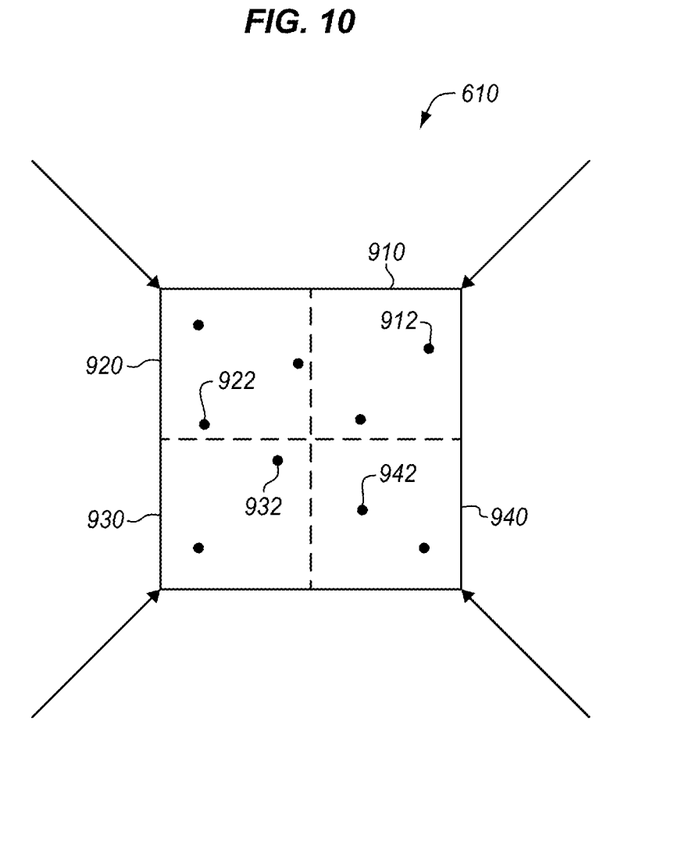

In step 318, the scanning window is divided into quadrants. FIG. 9 illustrates that when a scanning window is analyzed to create/generate new coordinates, the scanning window is logically divided into quadrants (910, 920, 930, and 940), and FIG. 10 provides a top-down view of the same concept. In step 320 the highest scoring coordinate from each quadrant is selected. In this case, the highest scoring points are coordinates of FIG. 9 are 912, 922, 932, and 942. The selected coordinates from each quadrant will be used to define an additional point to add to the cloud.

Figure 11:
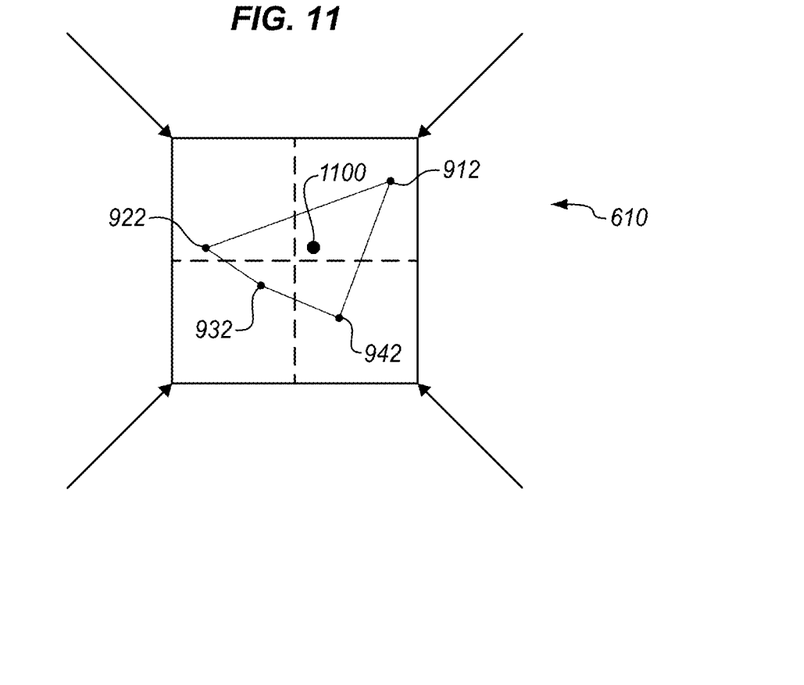
FIG. 11 is a diagram illustrating the generation of a new point within a scanning window in an exemplary embodiment.

In step 322, controller 140 generates an additional coordinate, and positions the additional coordinate within the cloud (i.e., within a 3D volume) based on the selected coordinates. For example, the position (X, Y, Z) for the additional coordinate may be defined as the average of the positions of the selected coordinates (as projected in the image, or in their original 3D space), the center of the scanning window at an average "depth" of the selected coordinates, the centroid of the four selected points, etc. The additional coordinate may further be projected onto the 2D color image to associate the new coordinate with a specific pixel. FIG. 11 illustrates the generation of an exemplary new coordinate 1100 based on coordinates 912, 922, 932, and 942. Once the new coordinate has been generated, another scanning window may be chosen for a new location within the image.

In step 324, controller 140 determines whether the backfilling process has been completed. The backfilling process may be completed, for example, when the entire 2D color image has been covered by one or more sweeps with scanning windows of different sizes, when a certain threshold number of additional coordinates have been generated for the cloud, when the ratio of coordinates in the cloud to pixels in the image exceeds a threshold, etc. In each new sweep, coordinates from a previous sweep may be included in the cloud and used to generate still more coordinates.

Figure 12:
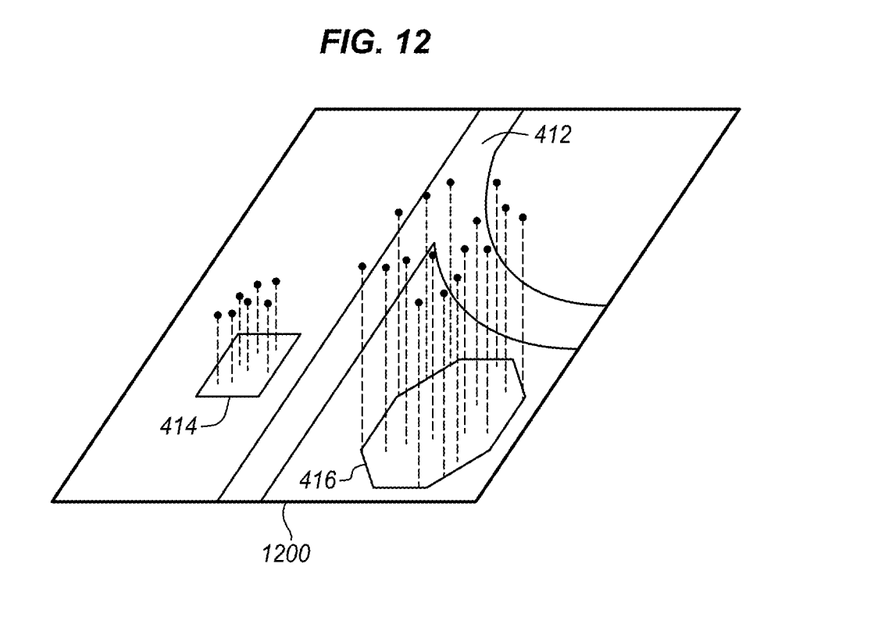
FIG. 12 is a perspective view of a backfilled cloud of coordinates projected onto an image in an exemplary embodiment.

If the backfilling process has not yet completed, then a new scanning window is selected and processing continues to step 312. FIG. 12 is a diagram 1200 illustrating the exemplary addition of coordinates to a cloud, caused by the backfilling process. For the sake of simplicity, FIG. 12 illustrates only coordinates that correspond with building 414 and office 416.

Alternatively, if the backfilling process has completed, then controller 140 may color each coordinate of the backfilled cloud to match the color of the pixel it has been projected onto. Thus, coordinates in the cloud that correlate with green pixels are colored green, those that correlate with red pixels are colored red, and so on. In step 326, controller 140 displays the backfilled cloud (e.g., by transmitting the backfilled cloud to a monitor/screen as a colored 3D object/model). The cloud may be interpreted for display such that each coordinate in the cloud is a voxel, such that a tessellated surface is created based on each coordinate within the cloud, etc. In this manner, when the cloud is presented via a display, it depicts a 3D version of the object/scenery originally imaged by ranging system 110 and camera 120.

Method 300 provides an advantage over prior techniques, in that it reliably generates an additional coordinate for each scanning window. This in turn increases the stability and accuracy of the backfilling process, which enhances image quality.

In a further embodiment, multiple ranging systems are used to measure distances concurrently. A controller is then used to analyze the measured distances and merge/blend them into a combined 3D cloud, based on the relative positions of the ranging systems with respect to each other. For example, if a first ranging system is positioned forward of a second ranging system, the cloud acquired by the first ranging system may have each of its measured coordinates formulaically shifted backwards so that the coordinates of the merged cloud are all defined with respect to the second ranging system. If the ranging systems utilize different fields of view, then their clouds may be stretched or squeezed into a uniformly defined space. In an angular coordinate system, coordinates may have their angles and distance adjusted based on the orientations and positions of the ranging systems with respect to each other. Similar techniques may be used to merge additional clouds together.

In a further embodiment, a multi-lens camera system may be used to enhance the field of view and/or resolution of the acquired 2D image. In one such embodiment, the controller may direct a GPU to merge images taken by each lens together based on the known orientations and positions of the lenses with respect to each other. In another embodiment, the controller directly receives integrated images from the camera.

While the selection and processing of scanning windows is described as an iterative process herein, it may be performed as a massively parallel process by a GPU of the controller, where multiple scanning windows are defined and processed concurrently in order to enable real-time backfilling of the cloud. Thus, in a still further embodiment, multiple scanning windows may be analyzed in parallel by a GPU (a GeForce 690 GPU processor) of the controller in order to generate additional points for the point cloud. Then, the controller iterates to a new scanning window size, and repeats the process. In this example, the controller runs "sweeps" of backfilling for an odd-sized 5×5 pixel scanning window, 7×7 pixel scanning window, and 15×15 pixel scanning window. In order to ensure that memory is not exhausted by the processing of large scanning windows, the controller processes larger scanning windows by only considering "corner" regions of those larger scanning windows. That is, a 15×15 pixel scanning window is processed by reviewing smaller regions (in this example, 4×4 pixel regions) in the upper left, upper right, bottom left, and bottom right of the window as a whole, while other portions within the scanning window are intentionally ignored.

Figure 13:
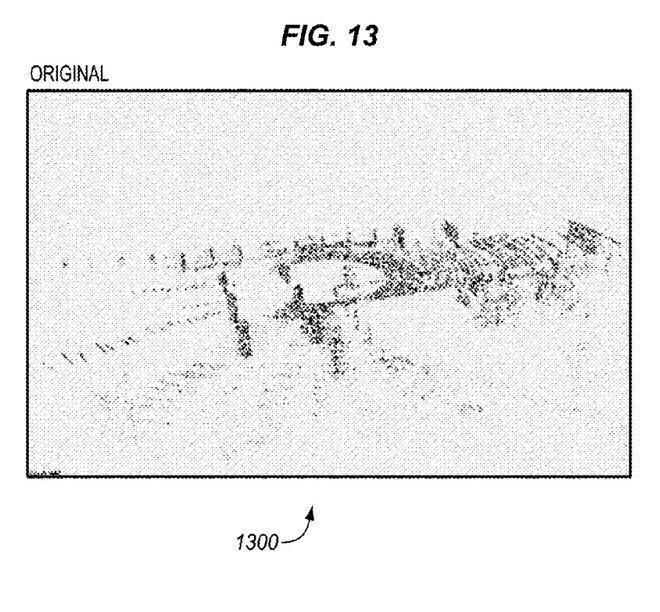
FIGS. 13-14 are diagrams illustrating non-backfilled and backfilled clouds of coordinates.
Figure 14:
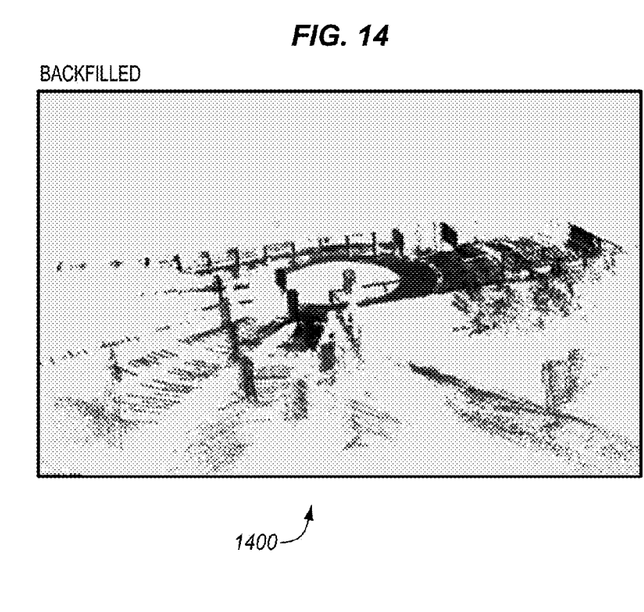

FIGS. 13-14 are diagrams 1300-1400 illustrating non-backfilled and backfilled point clouds in an exemplary embodiment. As shown herein, portions of diagram 1300 are missing or not entirely filled in, while the backfilled version shown in 1400 is substantially more complete.

In one example, a UAV utilizes the backfilling techniques described above to image a region that it is currently flying over. In this example, the UAV implements an onboard controller for integrating 3D LIDAR point clouds (that is, clouds of 3D coordinates) with 2D panoramic color images in real time. A camera of the UAV (a Point Grey Ladybug III panoramic video system) continuously acquires 2D color images encompassing a 360 degree field of view at a rate of ten frames a second, and a LIDAR system at the UAV (a Velodyne 64E LIDAR sensor) similarly acquires 360 degree ranging data for 3D point clouds encompassing the field of view at a rate of ten frames per second.

A controller of the UAV receives a point cloud of LIDAR data from the LIDAR system that was taken at substantially the same time as a 2D color image generated by the camera. The controller then projects points from the point cloud onto the 2D color image based on triangulation techniques, backfills the 3D point clouds as described above, and transmits the backfilled 3D point clouds to a remote pilot for display.

Figure 15:
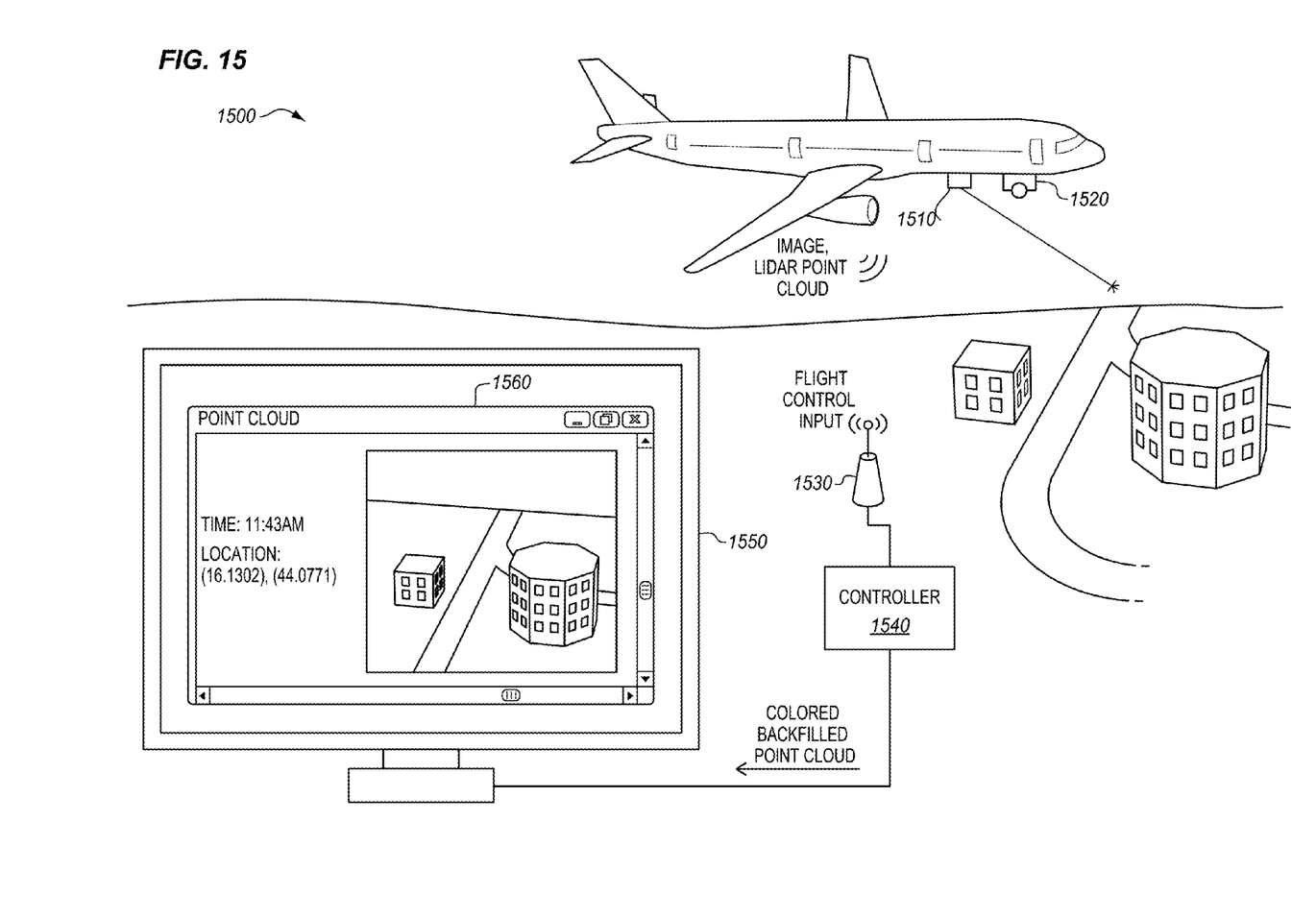
FIG. 15 is a diagram illustrating a vehicle implementing onboard LIDAR and camera integration in an exemplary embodiment.

FIG. 15 illustrates a further example, which utilizes a UAV 1500 implementing onboard LIDAR and camera integration in an exemplary embodiment. The camera system for this example is shown as element 1520, while the LIDAR system is shown as element 1510. As UAV 1500 travels above the terrain, it generates raw LIDAR and camera data, and transmits this information back to a transceiver 1530 at a remote location. In this embodiment, a remotely located controller 1540 engages in backfilling and coloring processes for the point cloud. The backfilled colored 3D point cloud is then sent for viewing at display 1550 within software window 1560. In this manner, a pilot in a remote location may rotate or zoom the 3D scene as the scene updates in real time, giving the pilot a vastly enhanced understanding of the environment in which UAV 1500 is flying.

Any of the various elements shown in the figures or described herein may be implemented as hardware, software, firmware, or some combination of these. For example, an element may be implemented as dedicated hardware. Dedicated hardware elements may be referred to as "processors," "controllers," or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. An apparatus comprising:
a camera configured to capture a two dimensional image in a field of view;
a ranging system configured to measure distances to at least one object in the field of view; and
a controller configured to analyze the distances to generate a cloud of three dimensional coordinates, and to project coordinates of the cloud onto the image to match the coordinates with corresponding pixels of the image;
the controller is configured to generate additional coordinates to increase the resolution of the cloud by iteratively: defining a scanning window encompassing a portion of the image, detecting a group of coordinates that have been projected onto the scanning window, scoring each coordinate in the group based on its similarity to other coordinates in the group, dividing the scanning window into quadrants, selecting only the highest scoring coordinate from each quadrant, and generating an additional coordinate that is positioned within the cloud based on the selected coordinates, wherein the position of the additional coordinate along each of three spatial axes is determined based on the selected coordinates, and
wherein the controller is further configured to transmit the cloud for display.

2. The apparatus of claim 1, wherein:
the controller is configured to score the coordinates of the group based on color similarity.

3. The apparatus of claim 1, wherein:
the controller is configured to score the coordinates of the group based on their proximity to other coordinates in the group.

4. The apparatus of claim 1, wherein:
the controller is configured to position the additional coordinate based on averages of positions of the selected coordinates.

5. The apparatus of claim 1, wherein:
the ranging system is configured to measure a set of distances within the field of view at a rate of multiple times per second,
wherein the controller is configured to determine that the ranging system is measuring a new set of distances, and to capture an image for the frame from the camera while the new set of distances is being measured.

6. The apparatus of claim 5, wherein:
the ranging system is configured to measure distances corresponding to a 360 degree field of view that includes the at least one object; and
the camera is configured to capture images corresponding to a 360 degree field of view that includes the at least one object.

7. The apparatus of claim 1, further comprising:
multiple ranging systems that are each configured to measure distances,
wherein the controller is configured to generate a combined cloud of three dimensional coordinates based on the distances measured by each ranging system.

8. The apparatus of claim 1, wherein:
the camera comprises a panoramic multi-lens camera.

9. The apparatus of claim 1, wherein:
the ranging system comprises a Light Detection and Ranging (LIDAR) system.

10. The apparatus of claim 1, wherein:
the controller is configured to generate multiple additional points for the cloud in parallel by utilizing multiple scanning windows in parallel.

11. A method, comprising:
acquiring a two dimensional image in a field of view;
acquiring measured distances to at least one object in the field of view;
analyzing the measured distances to generate a cloud of three dimensional coordinates;
projecting coordinates of the cloud onto the image to match the coordinates with corresponding pixels of the image;
generating additional coordinates to increase the resolution of the cloud, by iteratively:
defining a scanning window encompassing a portion of the image;
detecting a group of coordinates that have been projected onto the scanning window;
scoring each coordinate in the group based on its similarity to other coordinates in the group;
dividing the scanning window into quadrants;
selecting only the highest scoring coordinate from each quadrant; and
generating an additional coordinate that is positioned within the cloud based on the selected coordinates, wherein the position of the additional coordinate along each of three spatial axes is determined based on the selected coordinates; and
displaying the cloud.

12. The method of claim 11, wherein scoring each coordinate comprises:
scoring coordinates of the group based on color similarity.

13. The method of claim 11, wherein scoring each coordinate comprises:
scoring coordinates of the group based on their proximity to other coordinates in the group.

14. The method of claim 11, further comprising:
positioning the additional coordinate based on averages of positions of the selected coordinates.

15. The method of claim 11, further comprising:
operating a ranging system to measure a set of distances within the field of view at a rate of multiple times per second;
determining that the ranging system is measuring a new set of distances; and
capturing an image for the frame from the camera while the new set of distances is being measured.

16. The method of claim 11, wherein:
the measured distances correspond to a 360 degree field of view that includes the object, and the images correspond to a 360 degree field of view that includes the object.

17. The method of claim 11, wherein:
the image is acquired from a panoramic multi-lens camera.

18. A non-transitory computer readable medium embodying programmed instructions which, when executed by a processor, are operable for performing a method comprising:
acquiring a two dimensional image in a field of view;
acquiring measured distances to at least one object in the field of view;
analyzing the measured distances to generate a cloud of three dimensional coordinates;
projecting coordinates of the cloud onto the image to match the coordinates with corresponding pixels of the image;
generating additional coordinates to increase the resolution of the cloud, by iteratively:
defining a scanning window encompassing a portion of the image;
detecting a group of coordinates that have been projected onto the scanning window;
scoring each coordinate in the group based on its similarity to other coordinates in the group;
dividing the scanning window into quadrants;
selecting only the highest scoring coordinate from each quadrant; and
generating an additional coordinate that is positioned within the cloud based on the selected coordinates, wherein the position of the additional coordinate along each of three spatial axes is determined based on the selected coordinates; and
displaying the cloud.

19. The medium of claim 18, wherein scoring each coordinate comprises:
scoring coordinates of the group based on color similarity.

20. The medium of claim 18, wherein scoring each coordinate comprises:
scoring coordinates of the group based on their proximity to other coordinates in the group.

* * * * *